United States Patent
Wu

(10) Patent No.: US 6,639,149 B1
(45) Date of Patent: Oct. 28, 2003

(54) LAMP CONNECTING ROD AND WIRE CONNECTION BOX ASSEMBLING STRUCTURE

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 10/397,244

(22) Filed: Mar. 27, 2003

(51) Int. Cl.[7] .................................. H01J 5/00
(52) U.S. Cl. ........................ 174/50; 174/48; 174/58; 220/4.02
(58) Field of Search .................. 220/4.02, 3.8, 220/3.6; 174/50, 48, 58, 63, 17 R

(56) References Cited

U.S. PATENT DOCUMENTS

| | | | | |
|---|---|---|---|---|
| 6,395,979 B1 | * | 5/2002 | English | 174/50 |
| 6,441,302 B1 | * | 8/2002 | Wu | 174/50 |
| 6,499,621 B1 | * | 12/2002 | Yamaguchi et al. | 220/612 |
| 6,545,217 B2 | * | 4/2003 | Sato | 174/50 |
| 6,568,551 B2 | * | 5/2003 | Grossenbacher | 220/4.02 |

* cited by examiner

Primary Examiner—Joseph M. Moy
(74) Attorney, Agent, or Firm—Troxell Law Office PLLC

(57) ABSTRACT

The present invention discloses a lamp connecting rod and wire connection box assembling structure, comprising a fixed base on a wire connection box, said fixed base at its rear end having a conductive socket and at the front end of a connecting rod supported by a bulb socket separated from the wire connection box having a rod connector, and said connector having a conductive connector therein; said fixed base at its rear end comprising an accommodating groove for accommodating said conductive socket, and a gate board being embedded into an embedded groove of said accommodating groove to limit the position of said conductive socket; said rod connector at its front end having a positioning groove for fixing a latch bracket; said rod connector being embedded into an inner hole of said fixed base and said conductive connector being plugged into said conductive socket for the connection of power supply, and said latch bracket latching into a latching hole to fix the connecting rod and provide a fast assembling as well as reduce the volume and cost for transporting the lamp.

3 Claims, 4 Drawing Sheets

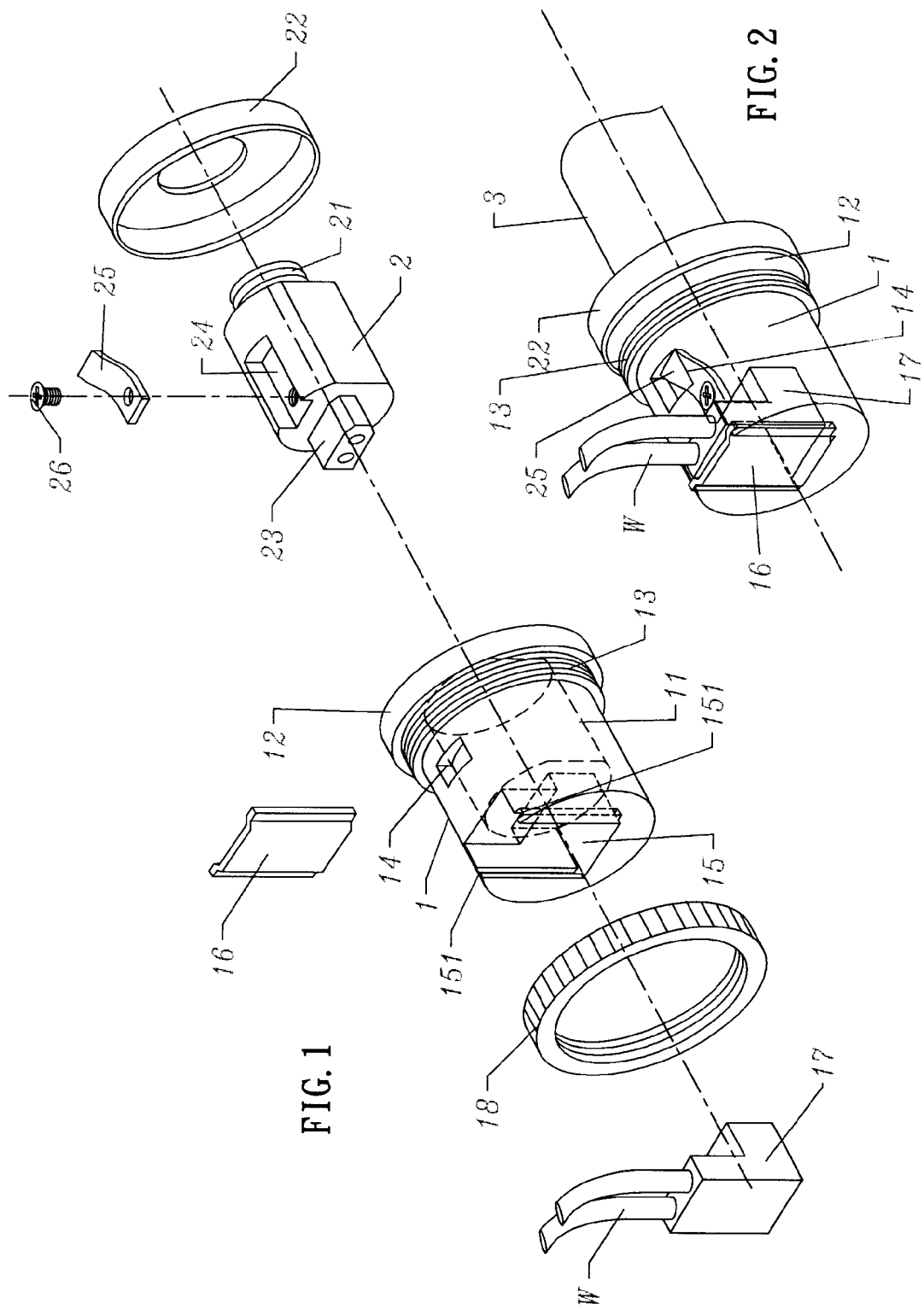

LAMP CONNECTING ROD AND WIRE CONNECTION BOX ASSEMBLING STRUCTURE

BACKGROUND OF THE INVENTION

1. Field of the Invention

The present invention relates to a lamp connecting rod and wire connection box assembling structure, of which the wire connection box is detachable from the lamp to reduce packing volume, lower packing cost, and making the assembling very easy for users; this invention provides a quick assembling technique to connect a light bulb to the power supply after the assembling is completed.

2. Description of the Related Art

The requirements of lamps at the present stage primarily focus on reducing material volume, lowering transportation cost, and providing a safe and convenient assembling way for users to improve market competitiveness. To avoid electric leakage, lamp manufacturers usually connect a power cord with a light bulb socket on the lamp rod before shipping the lamp out from the factory. However, such doing definitely causes a large packing volume and increases the transportation cost. Furthermore, such arrangement is inconvenient to users, because an electric wire exists between the lamp base and the wire connection box, which cannot be separated easily. The users may have to fix the wire connection box onto the wall, but the lamp base having a large volume and a heavy weight makes the assembling very difficult, and easily causes accidents (such as the falling of the lamp). Moreover, the pull between electric wires made during the installation procedure brings in frictions and has the risk of scratching the surface of electric wires and exposing the copper wire therein.

In general, the problems existing in packaging, transportation, and installation of a lamp include:

1. Large packing volume increases the transportation cost.
2. As to the assembling, users have trouble to install the lamp by themselves since the volume of the lamp is large and the weight is heavy, which easily cause accidents such as falling.
3. The electric wire in the lamp has been connected, and may scratch the wire due to the friction produced during the installation and cause electric leakage.

SUMMARY OF THE INVENTION

The primary objective of the present invention is to solve the foregoing problems by taking the following measures. The present invention separates the wire connection box and the lamp base first, and the user only needs to install the wire connection box onto a wall, and then connects the lamp rod to the wire connection box for the installation for power connection. The present invention resides on:

1. The present invention comprises a fixed base coupled to a wire connection box, having a conductive socket at its rear end, and said conductive socket connects the power supply to the power supplying end, such that the wire connection box can be installed easily without connecting the lamp yet, and said fixed base has a latch hole thereon for coupling to an inner hole of the fixed base in order to fix a latch bracket of the rod connector in a fixed position as described in a later section.
2. The present invention provides a connecting rod for coupling to a light bulb base, but fully detachable from the wire connection box, and a rod connector disposed at the front end of said connecting rod, and a conductive connector disposed therein and protruding from the front end of said rod connector; a positioning groove is disposed on the rod connector for fixing a latch bracket; by means of embedding the rod connector into an inner hole of the fixed base as described previously such that the latch bracket bounce back into the latch hole as described previously, and the rod connector is secured in the fixed base to prevent it from being drawn out. In the meantime, said conductive connector is coupled to the electric socket for power connection and supplying electric power to the light bulb socket.

Therefore, the present invention achieves the effects as listed below:

1. The wire connection box and the wire connection base are detached for packaging, which can reduce the packing volume and lower the cost.
2. Since the detailed detachable status, users only need to install the wire connection box onto the wall without carrying any lamp. The weight is light and the volume is small, which make the installation simple, easy, and quick, without the risk of having the lamp fallen down.
3. The electric wire is separated between the wire connection box and the lamp to avoid friction scratching the wire for the safety purpose.
4. The structure of the present invention can provide a quick and convenient way for connecting the lamp mechanically and electrically.

The following section describes the lamp connecting rod and wire connection wire assembling structure in accordance with the present invention. Since there are different kinds of lamps including ceiling lamp, wall lamp, table lamp, and floor lamp, etc., there is an issue of connecting the wire connection box with the connecting rod. However, adopting the structure of this invention can solve the foregoing issues.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which:

FIG. 1 is a perspective diagram of the parts of the present invention.

FIG. 2 is a perspective diagram of the assembled structure of the present invention.

DETAILED DESCRIPTION OF THE PREFERRED EMBODIMENTS

Figure 3:
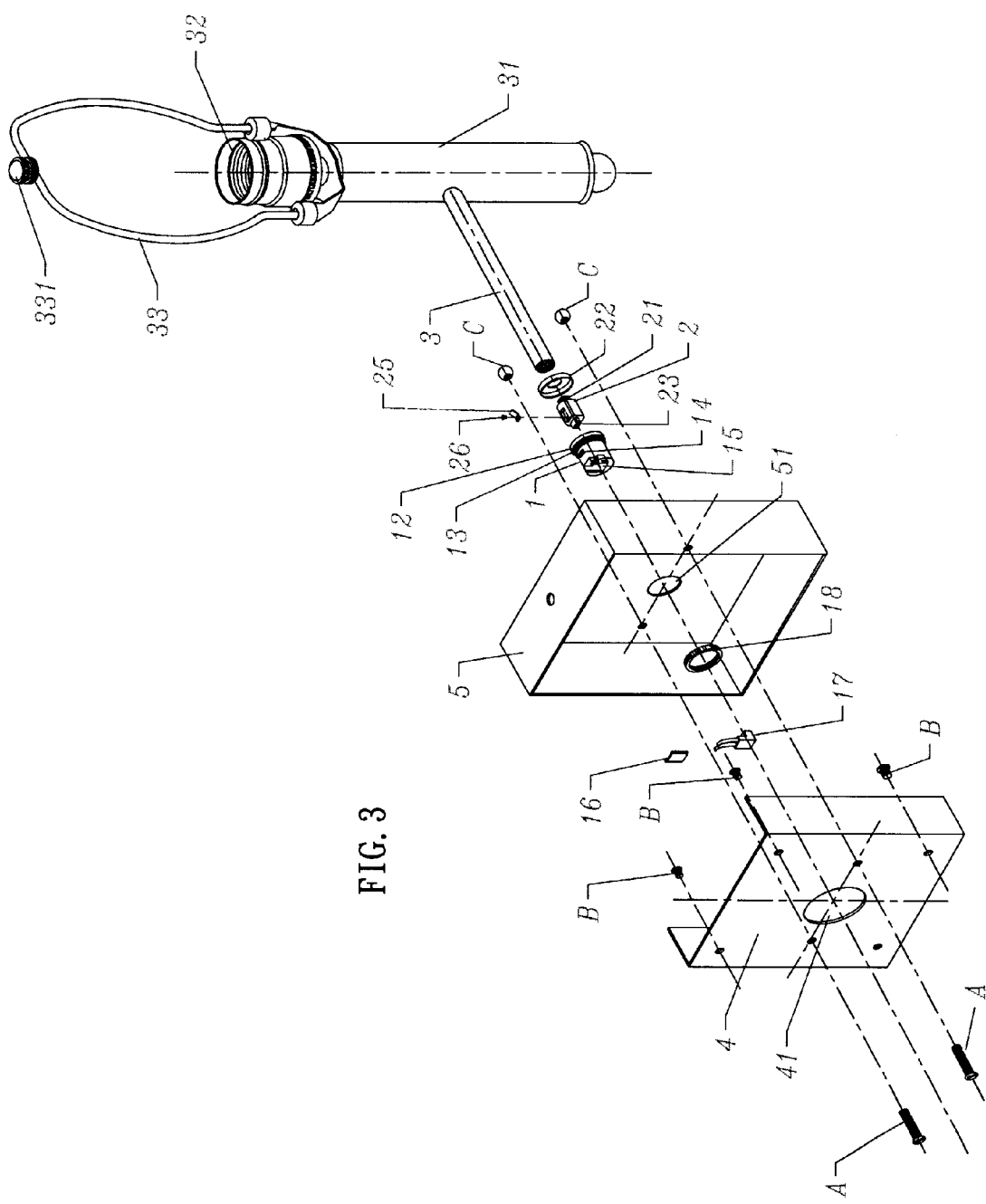
FIG. 3 is a perspective diagram of the disassembled parts for the installation of the present invention as depicted in FIG. 1.

Please refer to FIGS. 1, 2, and 3. A fixed base 1 comprises an inner hole 11 therein, a limit flange 12 at its front end, and coupled with a fixed screw 13, said fixed screw 13 at its rear end having a latch hole 14 connected with said inner hole 11;

said fixed base at its rear end having an accommodating groove 15 connected with said inner hole 11; an embedding groove 151 being disposed on both sides of said accommodating groove 15 for receiving a gate board 16; said accommodating groove 15 accommodating a conductive socket 17 and limiting the position of said conductive socket before suing said gate board 16.

A rod connector 2 has a screw pipe 21 at one end and a cover 22 coupled to said screw pipe 21, and a connecting rod 3 being coupled to said screw pipe 21 and pressing said cover 22 against the end surface of the rod connector 2, and said connector 2 having a positioning groove 24 thereon for accommodating a latch bracket 25, and being slightly tilted backward along the axial direction and higher than the surface of the rod connector 2 to fix said latch bracket 25 into said positioning groove 24 by a screw 26. Please refer to FIG. 4 for fixing the rod connector 2 onto said connecting rod 3. The electric wire of said conductive connector 23 extends into said rod connector 2, and then into a lamp rod 31, and coupled to a light bulb socket 32; a support stand 33 above said light bulb socket 32 supports a lampshade (not shown in the figure) of different shapes, and fixes the lampshade with a fixer 331.

Figure 4:
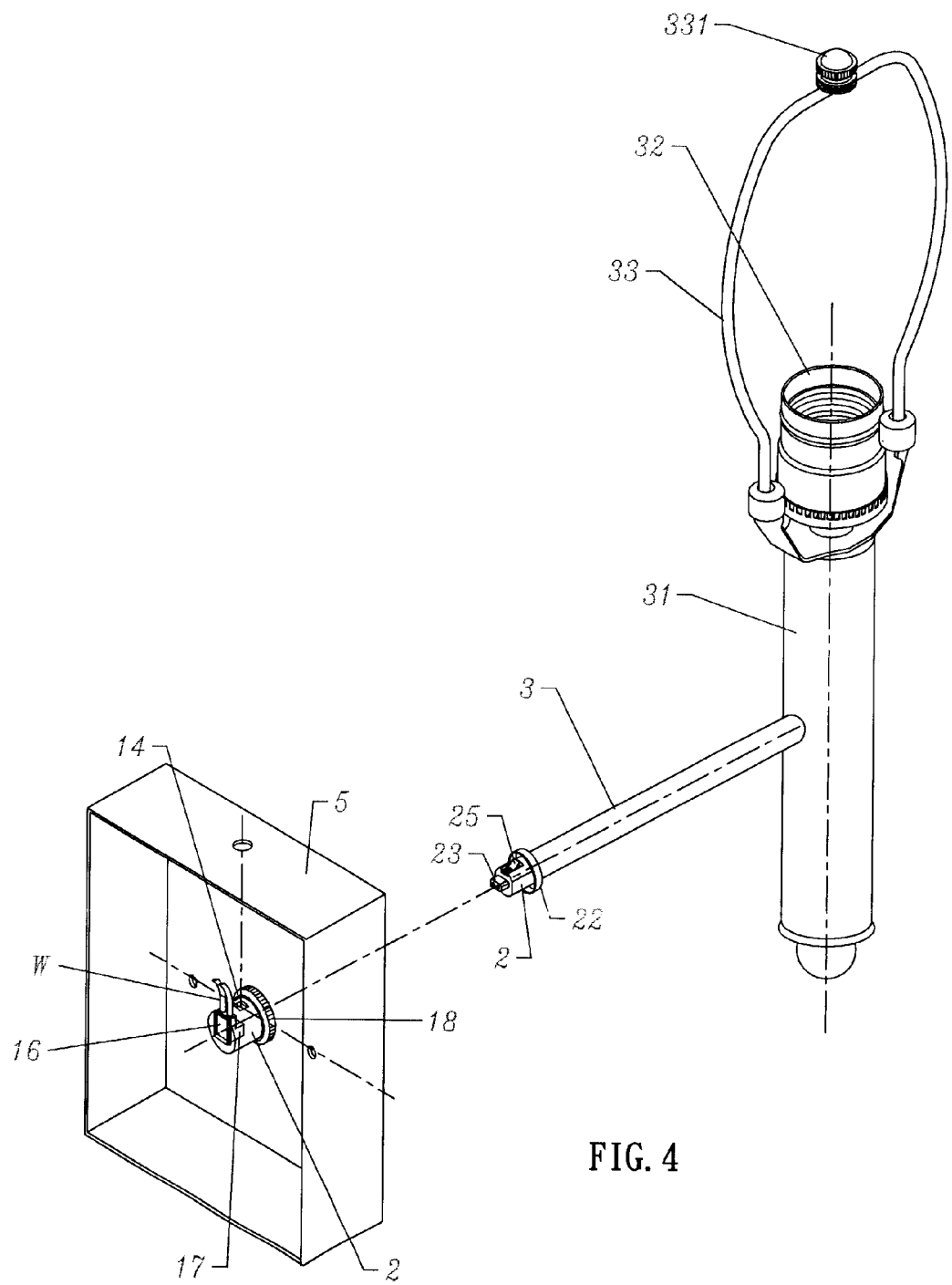
FIG. 4 is a perspective diagram of the installation of the present invention.

Please refer to FIGS. 1, 3, and 4 for the installation of this invention. After a plurality of coupling screws A pass through a fixed box 4 for fixing the wire connection box, and the positioning screw B fixes the fixed box 4 onto a position on the wall, and then a thread hole 41 is disposed thereon for passing a power cable through the thread hole 41 to connect with an electric wire W of said connective socket 17; a fixed hole 51 is disposed on a wire connection box 5 for letting the fixed base pass through such that its limit flange 12 presses against the end surface of said wire connection box 4, and a fixed ring 18 is coupled to a fixed screw 13 of said fixed base 1, and presses the fixed hole 51 against the position between said limit flange 12 and said fixed ring 18; a conductive socket 17 is disposed in the accommodating groove 15 of the fixed base 1 and sealed by a gate board 16 being embedded into an embedded groove 151 of the accommodating groove 15. Said gate board 16 exactly presses against said conductive socket 17 to prevent the conductive socket 17 from falling out, and to be fixed into a secured position inside said accommodating groove 15.

Figure 5:
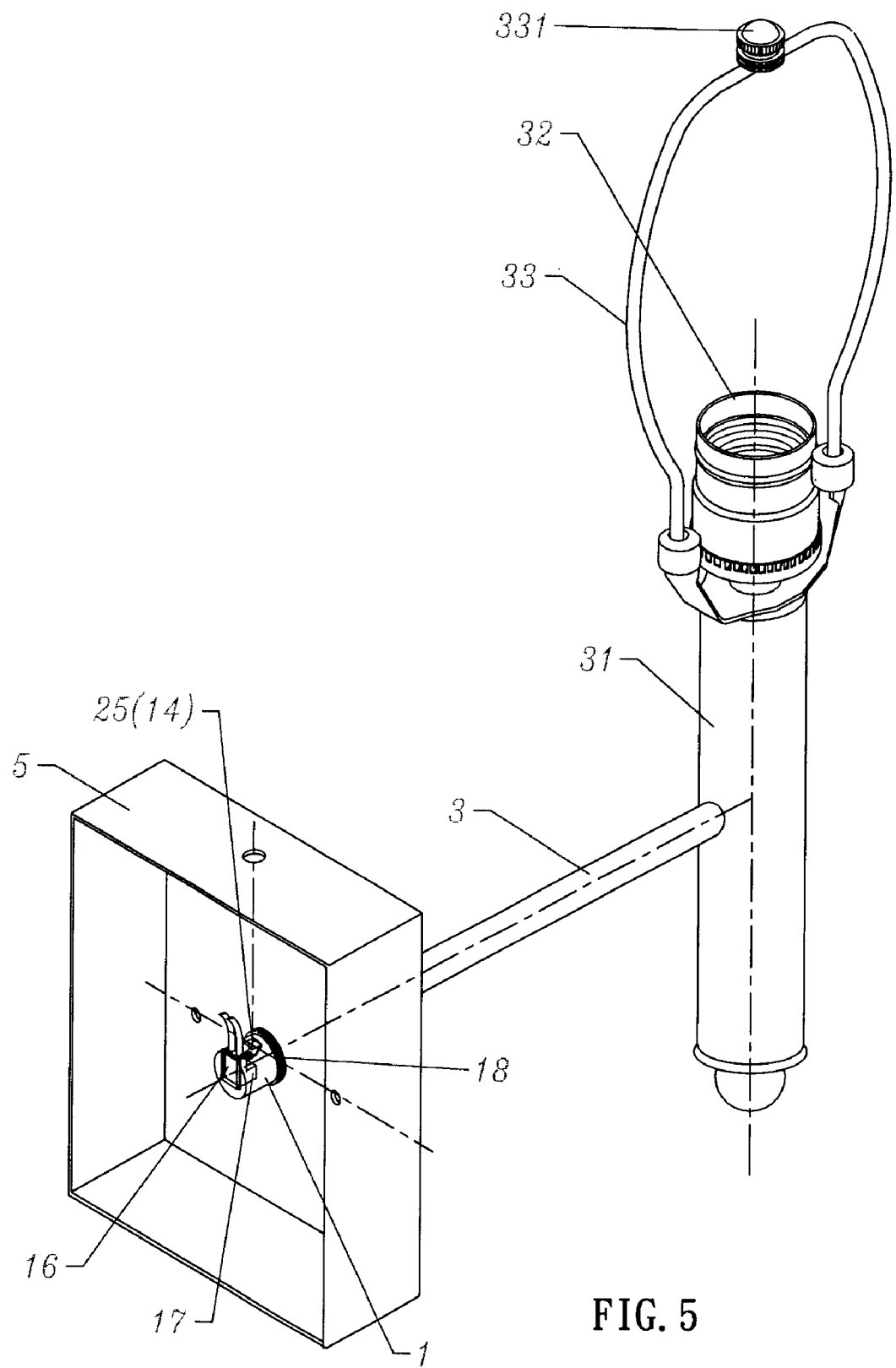
FIG. 5 is a perspective diagram of the assembled structure according to a preferred of the present invention.

Please refer to FIGS. 4 and 5. Said wire connection box 5 is covered on said fixed box 4, the preset coupling screw A exactly passes through the front end of the wire connection box, such that the coupling screw nut C is secured onto the coupling screw A, and secure the wire connection box 5 with the fixed box 4. Said fixed base 1 has been secured onto the wire connection box 5, and the rod connector 2 onto the connecting rod 3. Please refer to FIG. 2 again. If the rod connector 2 is embedded into the fixed base 1, then the latch bracket 25 of the rod connector 2 is pressed and fallen into the positioning groove 24 due to its sliding into the inner hole 11 of the fixed base 1. When the conductive connector 23 is plugged into the conductive socket 17 for electric power connection, said latch bracket 25 bounces back to the latch hole 14 of the fixed base 1 such that the rod connector 2 is limited in a position of the latch hole 14 of the latch bracket 25 by the counter latch in order to achieve an easy and fast installation.

Further, the cover 22 disposed on said rod connector 2 is covered onto the limit flange 12 of the fixed base 1 to improve its artistic appearance.

Further, the inner hole 11 of said fixed base 1 and the shape of rod connector 2 can be connected with different corresponding shapes to provide the required direction for positioning the lamp rod 31, and prevent the coupling rod 3 from rotating.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lamp connecting rod and wire connection box rod assembling structure, comprising of
    a fixed base, having an inner hole therein, a limit flange at its front end, and being connected by a fixed screw, and said fixed screw at its rear end having a latch hole connected with said inner hole; said fixed base at its rear end having an accommodating groove connected with said inner hole; said accommodating groove accommodating and fixing a conductive socket;
    a rod connector, having a conductive connector therein and protruding from the front end of said rod connector, and a positioning groove disposed on said rod connector for accommodating a latch bracket into said positioning groove and being slightly tilted backward along the axial direction and higher than the surface of said rod connector to fix said latch bracket into said positioning groove;
    thereby said lamp connecting rod and said wire connection box being detachable from each other to reduce packing volume and lower packing cost; when said rod connector being embedded into said fixed base, the latch bracket of said rod connector sliding into the inner hole of said fixed base while being pressed and falling inside the positioning groove, such that said conductive connector being plugged into said conductive socket for power connection, and said latch bracket exactly bouncing back into the latch hole of said fixed base, so that said rod connector being prevented from coming out due to the counter latch of the latch bracket in the latch hole and achieving the effects for an easy assembling and a quick installation.

2. A lamp connecting rod and wire connection box rod assembling structure as claimed in claim 1, wherein said fixed base comprises an embedded groove on both sides of said accommodating groove for receiving a gate board and accommodating said conductive socket and thus limiting the position of said conductive socket before using said gate board.

3. A lamp connecting rod and wire connection box rod assembling structure as claimed in claim 1, wherein said inner hole of the fixed base and said rod connector have different corresponding shapes for the connection to provide the required directional positioning, and prevent said connecting rod from rotating.

* * * * *